US008738549B2

(12) United States Patent
Lingenfelder et al.

(10) Patent No.: US 8,738,549 B2
(45) Date of Patent: May 27, 2014

(54) PREDICTIVE MODELING (75) Inventors: Christoph Lingenfelder, Herrenberg (DE); Pascal Pompey, Nanterre (FR); Michael Wurst, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 13/214,097

(22) Filed: Aug. 19, 2011

(65) Prior Publication Data

US 2012/0158624 A1 Jun. 21, 2012

(30) Foreign Application Priority Data

Dec. 21, 2010 (EP) .................................... 10196088

(51) Int. Cl.
*G06N 5/00* (2006.01)
(52) U.S. Cl.
USPC ........................................................ 706/12
(58) Field of Classification Search
None
See application file for complete search history.

(56) References Cited

U.S. PATENT DOCUMENTS

| 6,546,379 | B1 * | 4/2003 | Hong et al. ..................... 706/14 |
| 7,006,947 | B2 * | 2/2006 | Tryon et al. ................... 702/183 |
| 7,020,593 | B2 * | 3/2006 | Hong et al. ...................... 703/2 |
| 7,031,901 | B2 * | 4/2006 | Abu El Ata ..................... 703/21 |
| 7,389,211 | B2 * | 6/2008 | Abu El Ata et al. .............. 703/2 |
| 7,389,288 | B2 * | 6/2008 | Chickering et al. ................. 1/1 |
| 7,480,640 | B1 * | 1/2009 | Elad et al. ...................... 706/14 |
| 7,499,897 | B2 * | 3/2009 | Pinto et al. ..................... 706/46 |
| 7,730,003 | B2 * | 6/2010 | Pinto et al. ..................... 706/21 |
| 7,933,762 | B2 * | 4/2011 | Pinto et al. ...................... 703/22 |
| 8,170,841 | B2 * | 5/2012 | Pinto et al. ....................... 703/2 |
| 2004/0111169 | A1 * | 6/2004 | Hong et al. ..................... 700/44 |
| 2004/0111220 | A1 * | 6/2004 | Ochs et al. ...................... 702/19 |
| 2005/0125434 | A1 | 6/2005 | Fan et al. |
| 2007/0189611 | A1 * | 8/2007 | Yang et al. .................... 382/228 |
| 2007/0244741 | A1 * | 10/2007 | Blume et al. .................... 705/10 |
| 2008/0065572 | A1 | 3/2008 | Abe et al. |
| 2009/0112927 | A1 * | 4/2009 | Chitnis et al. ............... 707/104.1 |
| 2009/0210371 | A1 * | 8/2009 | Laan ............................... 706/21 |
| 2010/0145896 | A1 * | 6/2010 | Yuta ............................... 706/12 |

OTHER PUBLICATIONS

Palmisano C. et al., "Using Context to Improve Predictive Modeling of Customers in Personalization Applications", IEEE Transactions on Knowledge and Data Engineering, vol. 20, No. 11, Nov. 2008, pp. 1535-1549.*

(Continued)

*Primary Examiner* — Jeffrey A Gaffin
*Assistant Examiner* — Dave Misir
(74) *Attorney, Agent, or Firm* — Janaki K. Davda; Konrad, Raynes, Davda and Victor LLP (57) ABSTRACT

A predictive analysis generates a predictive model (Padj (Y|X)) based on two separate pieces of information,
 a set of original training data (Dorig), and
 a "true" distribution of indicators (Ptrue(X)).
The predictive analysis begins by generating a base model distribution (Pgen(Y|X)) from the original training data set (Dorig) containing tuples (x,y) of indicators (x) and corresponding labels (y). Using the "true" distribution (Ptrue(X)) of indicators, a random data set (D') of indicator records (x) is generated reflecting this "true" distribution (Ptrue(X)). Subsequently, the base model (Pgen(Y|X)) is applied to said random data set (D'), thus assigning a label (y) or a distribution of labels to each indicator record (x) in said random data set (D') and generating an adjusted training set (Dadj). Finally, an adjusted predictive model (Padj(Y|X)) is trained based on said adjusted training set (Dadj).

20 Claims, 5 Drawing Sheets

(56) References Cited

OTHER PUBLICATIONS

Zeng L. et al., Event-Driven Quality of Service Prediction, ICSOC 2008, LNCS 5364, pp. 147-161, 2008.*
Estruch V. et al., "SMILES: A Multi-purpose Learning System", JELIA 2002, LNAI 2424, pp. 529-532, 2002.*
Yang Q. et al., "Incorporating Generic Learning to Design Discriminative Classifier Adaptable for Unknown Subject in Face Verification", Proceedings of the 2006 Conference on Computer Vision and Pattern Recognition Workshop (CVPRW'06), 2006.*
Hong S. et al., "Ensemble Modeling Through Multiplicative Adjustment of Class Probability", Proceedings of the IEEE International Conference on Data Mining, 2002, pp. 621-624.*
Ferri-Ramirez, C., J. Hernandez-Orallo, and M.J. Ramirez-Quintana, "SMILES v.2.3—A Multi-purpose Learning System", Technical Report, Sep. 5, 2002, XP55043547. [Retrieved on Nov. 8, 2012]. Retrieved from the Internet at <URL: http://users.dsic.upv.esf flip/papers/SMILES_Manual_2.3.pdf>, Total 90 pp.
Ferri-Ramirez, C., J. Hernandez-Orallo, and M.J. Ramirez-Quintana, "SMILES v.2.3—A Multi-purpose Learning System", Part 3, Technical Report, Sep. 5, 2002, XP55043547, Total 10 pp.
International Search Report & Written Opinion for PCT/EP2011/069333, Nov. 20, 2012, Total 13 pp.
Liu et al., "Generative Oversampling for Mining Imbalanced Datasets", Proceedings of the 2007 International Conference on Data Mining (DMIN'07), 25-28, Jun. 2007, Total 8 pp.
Weiss, G.M., "Mining with Rarity: A Unifying Framework", vol. 6, Issue 1, Jun. 2004, Total 14 pp.
Zadrozny, Langford, and N. Abe, "Cost-Sensitive Learning by Cost-Proportionate Example Weighting", Proceedings of the Third IEEE International Conference on Data Mining, Nov. 2003, 8 pp.

\* cited by examiner

PREDICTIVE MODELING

CROSS-REFERENCE TO RELATED FOREIGN APPLICATION

This application is a non-provisional application that claims priority benefits under Title 35, Unites States Code, Section 119(a)-(d) or Section 365(b) of European (EP) Patent Application No. 10196088.8, filed on Dec. 21, 2010, by Christoph Lingenfelder, Pascal Pompey, and Michael Wurst, which application is incorporated herein by reference in its entirety.

FIELD OF THE INVENTION

The invention relates generally to predictive modeling. Specifically, the invention relates to adapting an existing predictive model generated from a set of training data to additional information such as a given probability distribution of features.

BACKGROUND OF THE INVENTION

Predictive modeling is the process by which a model is created or chosen to try to best predict the probability of an outcome. Generally, the model is chosen on the basis of detection theory to try to guess the probability of an outcome given a set amount of input data (for example: given an e-mail determining how likely that it is spam). Thus, given a predefined set of features (indicators) X, predictive modeling aims at predicting the probability $P(Y|X)$ of a specific outcome Y. This task can be seen as a search for a "true" probability distribution $P(Y|X)$, which, however, is not directly observable. Rather, one has to try to generate an optimal distribution which should be chosen in such a way that the risk of false prediction over an underlying distribution $P(X)$ of features X is minimized. As a consequence, achieving good predictions for combinations of features X that appear frequently in the application area should be given high attention, while combinations that are expected to occur very rarely can be ignored.

In reality, neither the "true" probability distribution $P(Y|X)$ nor the "true" distribution of features $P(X)$ are completely known. Rather, they are approximated based on a training set of examples. The underlying assumption is that the "true" distributions $P(X)$, $P(Y|X)$ will behave just like the ones of the training examples. This is, however, often not the case. Moreover, the training set of examples may be noisy; in this case, adapting the model perfectly to the training data would lead to "over-fitting" and would yield a model that does not accurately reflect the "true" distributions $P(X)$, $P(Y|X)$. On the other hand, it may be known beforehand that the "true" distribution of features $P(X)$ differs from the distribution of the training data in an actual application domain. If, for example, a model predicting the spread of a given disease is to be generated, the training data may be erroneous since only a small fraction of the people testing positive may have been identified while it is known that the actual percentage is much higher. In this case, the distribution of the positive samples in the training data does not reflect the "true" distribution of the contagioned people.

If it is known that the training data exhibit a different distribution than the actual real-world data, this knowledge can be used to adapt the process of finding an optimal prediction model. Specifically, algorithms have been developed which are able to take a given distribution $P(X)$ or $P(Y)$ into account and combine it with the training data. The result is a model that obeys the constraints imposed by $P(X)$ or by $P(Y)$ and still approximates the training data as well as possible.

In the case of a given distribution $P(Y)$ of labels Y, this may be achieved using a cost sensitive classifier, as described in US 2008/0065572 A1. Such classifiers are supported by most state-of-the-art predictive analytics tools, such as IBM® SPSS® software or IBM® INFOSPHERE® WAREHOUSE (IBM, INFOSPHERE, and SPSS are trademarks of International Business Machines Corporation in the United States, other countries, or both).

In the case of a given distribution $P(X)$ of indicators X, this may be achieved by rejection sampling or by using example weights, as described in "Cost-Sensitive Learning by Cost-Proportionate Example Weighting", by B. Zadrozny et al., Proceedings of the Third IEEE International Conference on Data Mining (2003), p. 435 ff. Such methods are only supported for some algorithms on a product level; however, most algorithms can be extended accordingly.

All of these methods assume that the information about the actual "true" distribution $P(X)$ or $P(Y)$ is static and that it is known before the model training process starts. However, it is often desirable to be able to apply a single model to a variety of situations with different underlying "true" distributions $P(X)$. Furthermore, an analyst would often like to interactively explore the consequences of different assumptions about a distribution $P(X)$ of indicators X in terms of a what-if analysis. Using a single, global model in all of these situations would have severe disadvantages:

For one thing, the model would probably not be optimal in the sense of structural risk, as some cases may occur much more often in reality than in the training set and therefore should be given a higher attention than others.

Moreover, the model would probably be quite complex, even though in the application area only a small portion of the model may be relevant.

These problems could be solved by building a new model for each application area. This approach, however, requires a severe computational effort and, in the majority of cases, involves prohibitively long response times which renders the task non-interactive and does not allow the user to interactively try out different assumptions about the "true" distribution $P(X)$. Also, it poses a security risk organizationally, since everybody who employs the model and adapts it to a new application would need to obtain access to the actual source data.

Thus, there is a need for a predictive modeling method which circumvents these problems.

SUMMARY OF THE INVENTION

It is an object of the invention to provide a predictive modeling method which is capable of generating an optimal distribution based on a set of training data describing the relationship between indicators and values, and also incorporates constraints imposed by a given distribution of indicators. The method should be computationally efficient and should be capable of ensuring confidentiality of the source data.

These objects are achieved by the features of the independent claim. The other claims and the specification disclose advantageous embodiments of the invention.

According to a first aspect of the invention, a method for carrying out predictive analysis is provided. The method comprises the steps of (1) receiving a model estimating a base model distribution based on an original training set; (2) receiving a given "true" distribution of indicators; (3) generating a random data set of indicators based on the "true"

distribution of indicators; (4) applying the base model to said random data set, thus assigning a label or a distribution of labels to each indicator data point in said random data set and generating an adjusted training set; and (5) training an adjusted predictive model based on said adjusted training set.

According to a further aspect of the invention, a computer comprising a data processing system for carrying out predictive analysis is provided. The data processing system comprises (1) a Base Model Training System for estimating a base model distribution based on an original training set; (2) a Random Data Generating system for generating a random set of indicators based on a given "true" distribution of indicators; (3) an Assignment System for applying the base model to said random data set, thus assigning a label or a distribution of labels to each indicator data point in said random data set and generating an adjusted training set; and (4) an Adjusted Training System for training an adjusted predictive model based on said adjusted training set.

BRIEF DESCRIPTION OF THE DRAWINGS

The present invention together with the above-mentioned and other objects and advantages may best be understood from the following detailed description of the embodiments, but not restricted to the embodiments, wherein is shown in:

FIG. 1b a schematic flow diagram of a method step of verifying statistical significance of a data set generated in the method of FIG. 1a;

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

DETAILED DESCRIPTION OF EXAMPLE EMBODIMENTS

Figure 1A:
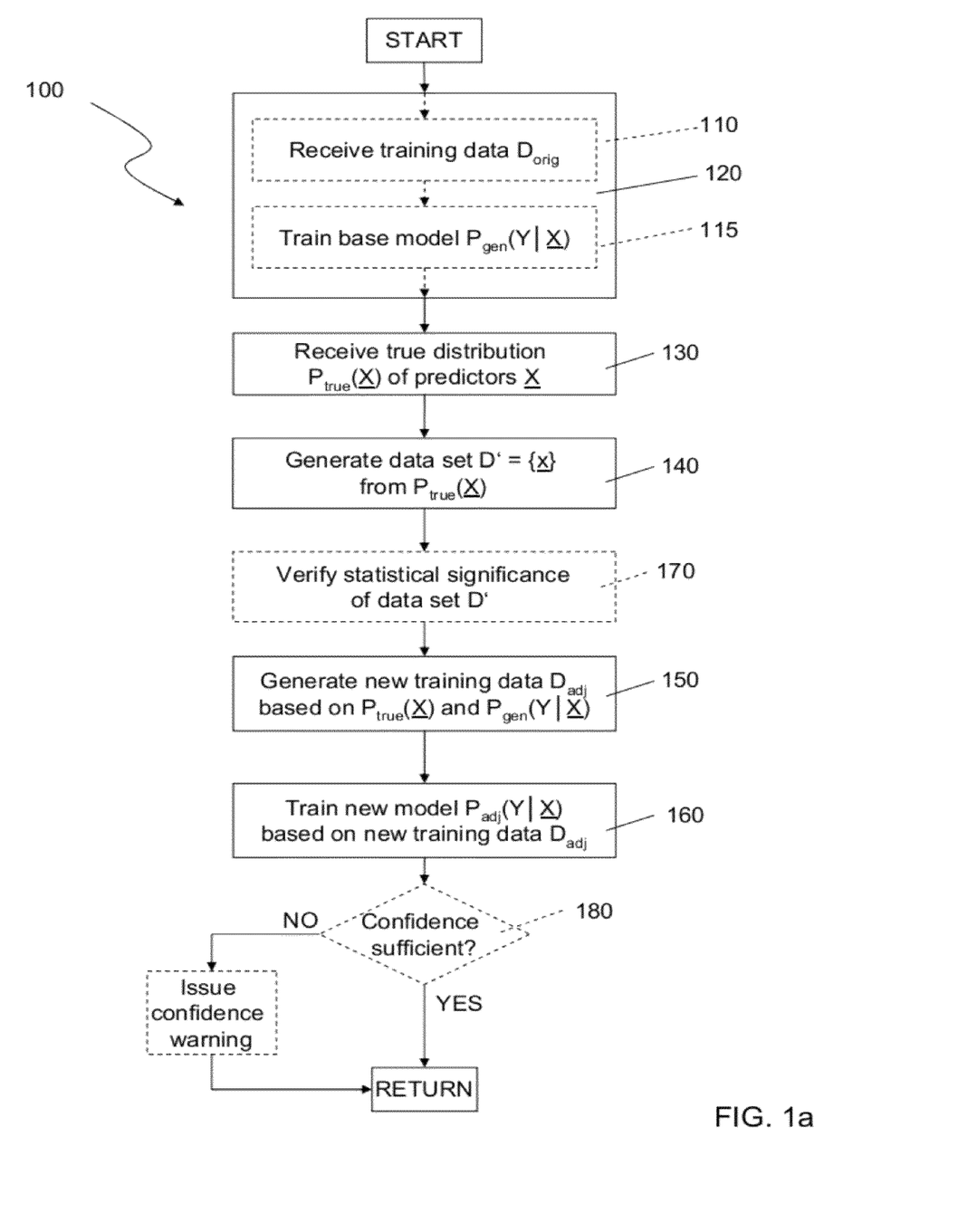
FIG. 1a a schematic flow diagram of an embodiment of a method for generating a predictive model based on training data $D_{orig}$ and a "true" distribution $P_{true}(X)$ of indicators.

FIG. 1a depicts a schematic flow diagram of a method 100 for determining a probability distribution P(Y|X) which predicts the probability of a specific outcome Y given a pre-defined set of features X. Here, X denotes a vector of variables (indicators) that describe influence factors and a single variable Y (value) that describes the prediction. Note that in the following, the variable X will be referred to by the terms "feature", "predictor" and "indicator" interchangeably, and the variable Y will be referred to by the terms "value", "label" or "prediction". All variables can be numeric or categorical. If the value variable Y is categorical, the method solves a classification problem, if it is numerical, it solves a regression problem. Both cases can be treated in a similar fashion.

The modeling process is based on an original set $D_{orig}$ of training data; $D_{orig}$ contains tuples of the form (x,y) where x∈X (i.e. x is an element of the set of indicators) and y∈Y (i.e. y is an element of the set of values). The set of vectors X spans the space of indicators, and the set of Y values spans the space of possible values of the prediction. As an example, if Y represents the churn of customers, and each customer is represented by a vector x containing age and income, an example of a tuple representing a 20 year old churner with an income of $1000 would look like: (<20, 1000>, churn).

FIG. 1a shows an embodiment of a method 100 aimed at training a predictive model with an optimal distribution $P_{adj}$(Y|X) based on two pieces of information:
1. the set of original training data $D_{orig}$ that describe the relationship between indicators X and values Y, and
2. assumptions on the true nature of the distribution of possible indicators $P_{true}(X)$. This distribution may be different in different areas of application. Especially, it may differ significantly from a distribution $P_{est}(X)$ as would be estimated based on the set of training examples $D_{orig}$.

Note that the distribution $P_{true}(X)$ does not have to be "true" in the sense that it accurately reflects reality; rather, $P_{true}(X)$ may contain assumptions about the reality which an analyst may choose to explore. Thus, in the framework of this patent, the term "true distribution $P_{true}(X)$" is taken to include any pre-defined distribution of indicators X (independent of its validity with respect to the real world).

Method 100 begins by receiving a base model $M_{gen}$ described as a distribution $P_{gen}(Y|X)$ based on an original set of training data $D_{orig}$ (step 120). In the embodiment of FIG. 1a, method 100 sets out from a set of training data $D_{orig}$ (step 110) to create a distribution $P_{gen}(Y|X)$, called the "base model" (step 115) that captures the relation between indicators X and label Y without considering the distribution P(X) of indicators X. $P_{gen}(Y|X)$ is trained in a way that is statistically significant, but generalizes as little as possible. $P_{gen}(Y|X)$ should capture all significant information about the relation between indicators X and labels Y. Depending on the model class used, this can be achieved in different ways. If, for instance, decision trees are used, a tree containing a minimum number of records in each leaf node and representing a significant deviation from the global a priori prediction would be trained. For an SVM (support vector machine) model, the capacity would be increased accordingly, etc.

In addition to the training data $D_{orig}$, method 100 takes into account a pre-defined distribution $P_{true}(X)$ of indicators X characterizing a given application area or scenario that an analyst would like to evaluate (step 130). Generally, the user will apply a distribution $P_{true}(X)$ that he deems to be the true distribution of X in the respective application area. This distribution may be partial, e.g. defining only the distribution of individual variables within X; in this case, the distributions for all remaining variables may be obtained from an estimated distribution $P_{est}(X)$ generated from the base model $P_{gen}(Y|X)$ (under the assumption that the remaining variables are independent of the variables explicitly specified).

Based on the assumptions of $P_{true}(X)$, a small random set D' of data points x is generated using a probabilistic scorer such as a Monte Carlo simulation or an analytical approach (step 140). The records x of D' are not yet labeled at that point. In order to assign labels y to the records x of data set D', the base model $P_{gen}(Y|X)$ is applied to these records x in D', supplementing each record x of D' with a prediction y, thus resulting in a new set of training data $D_{adj}$ in the form of tuples (x,y) (step 150). All records x in the random set D' are thus scored against $P_{gen}(Y|X)$, resulting in a set $D_{adj}$ of records that contains a prediction for each record x. This prediction can be a single label y or a distribution over labels. In the first case, $D_{adj}$ is a labeled set of records (x,y) that can subsequently be used with any predictive mining algorithm to train a new predictive model $P_{adj}(Y|X)$ (step 160), and this predictive model is returned to the user. In the second case, an extended predictive mining algorithm can be applied that is capable of making use of training data containing distributions of labels for each record x; this can be easily achieved for several different methods, e.g. Naïve Bayes and Decision Trees.

Since the data $D_{adj}$ were generated based on the base model $P_{gen}(Y|X)$ and adapting it to the true distribution $P_{true}(X)$, the new predictive model $P_{adj}(Y|X)$ estimated from $D_{adj}$ represents both these distributions as much as this is possible.

Note that steps 110 and 120 of the method 100 are performed only once, whereas the subsequent steps 130-160 may be performed several times if the assumptions on the true distribution $P_{true}(X)$ change (i.e. if the user thinks that $P_{true}(X)$ should be adapted or that a different kind of distribution $P_{true}(X)$ is to be explored).

The method 100 outlined above can yield a model making a prediction for any x. However, a verification step is recommended to ensure that the generative model will indeed produce statistically significant predictions on the indicators x which it is given. If, for example, the original data set $D_{orig}$ does not contain any records of individuals with age smaller than 10, then the generative model does not have any statistical basis to generalize on this domain. In this case, using the generative model on individuals with ages smaller than 10 will produce unreliable predictions. Therefore, a mechanism has to be put in place which enables the user to ensure that the model is not skewed by generalizing in regions of the training data $D_{orig}$ where it is not statistically significant.

Figure 1B:
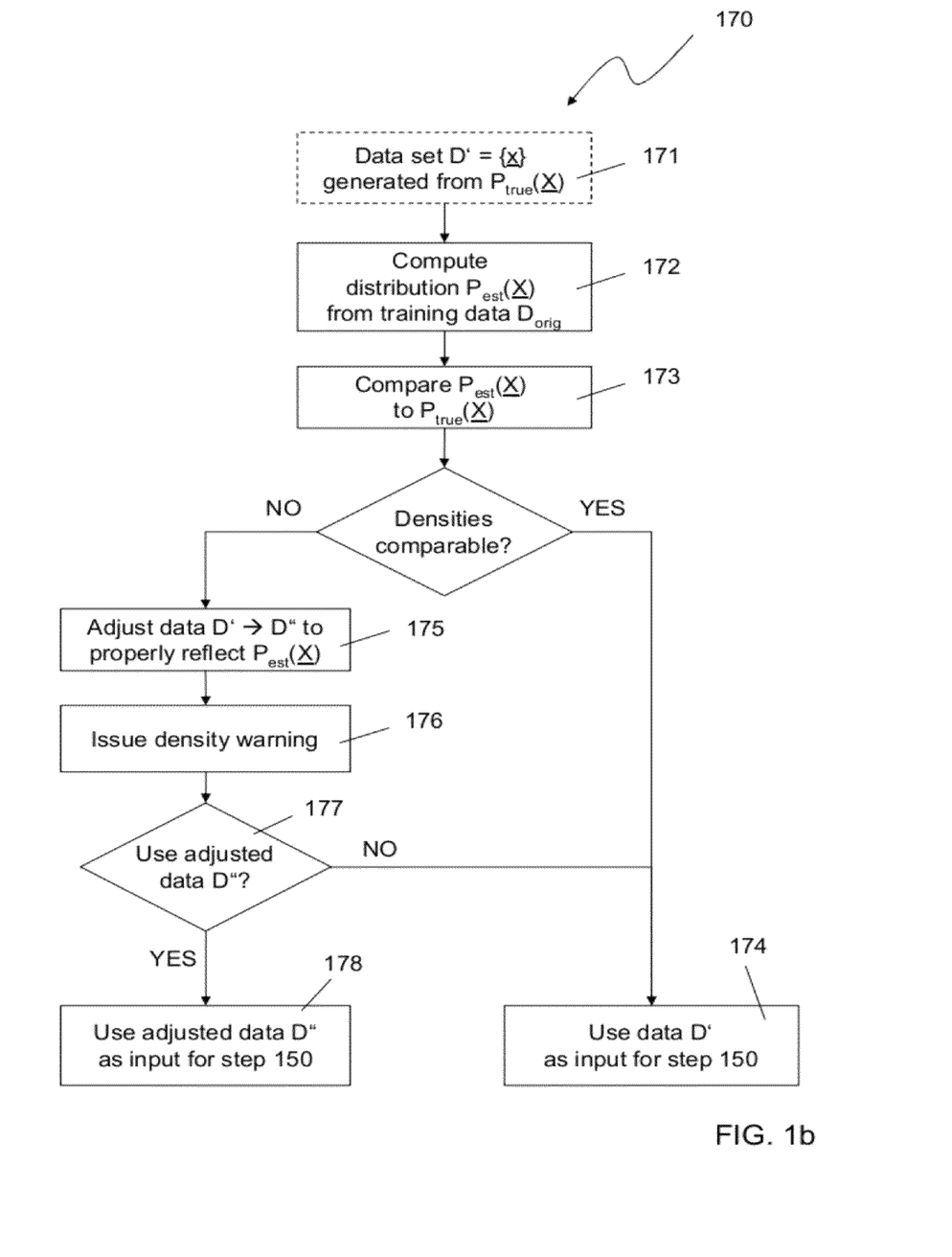

In order to achieve this, a verification step 170 is applied for verifying that the base model $M_{gen}$ produces reliable predictions for the random data set D' (as generated in step 140). The details of step 170 are illustrated in FIG. 1b. Once sample data set D' has been generated (step 171), a density model $P_{est}(X)$ is extracted from base model $P_{gen}(Y|X)$ (step 172). The density model $P_{est}(X)$ is an estimate of the probability for a data point x in each region based on the distribution of the training data $D_{orig}$ and thus provides reliable evidence on which parts of the input space are covered well based on the original training data $D_{orig}$. $P_{est}(X)$ may be generated by running a clustering algorithm or by using density estimators such as a OneClass SVM.

The density estimate of $P_{est}(X)$ in the training set is used to ensure that the generated examples cover only those parts of the variable space for which the model can make significant predictions. This usually requires that these parts of the variable space contain at least some minimal number of original data points. Thus, the true distribution $P_{true}(X)$ is tested to see whether it matches regions of $P_{est}(X)$ where a statistically significant number of points are present (step 173). If $P_{true}(X)$ is found to match domains of $P_{est}(X)$ presenting sufficient density, the sample data set D' generated in step 171 is used for calculating training data $D_{adj}$ (step 150) and for training the new predictive model $P_{adj}(Y|X)$. If, on the other hand, for some subset S of the random data set D' with a density above a predefined threshold $\alpha$ the density contained in $P_{est}(S)$ is smaller than some threshold $\beta$, all data points within subset S will be discarded, thus generating a new random data set version D" which contains only data points for which a reliable prediction is possible (step 175). A warning is issued (step 176) informing the user that the model could not be fully fitted to $P_{true}(X)$, i.e. the model could not be adapted in these parts of the variable space. The user may also receive listings of the data points that were discarded. The user may actively decide to either ignore these warnings (i.e. to continue with the originally (in step 140) generated sample data set D' (step 174) or to accept the changes and use the readjusted data D" as input for calculating training data $D_{adj}$ (step 178) and for training the new predictive model $P_{adj}(Y|X)$).

If the model $P_{gen}(Y|X)$ already contains a mechanism to provide a confidence for each prediction, this can be used in step 170 of method 100 to remove data points from D' for which no reliable prediction is possible and to issue a corresponding warning.

Note that step 150 makes use of a probabilistic scorer which assigns a probability distribution to each record x. This needs to be reflected in the procedure that generated the adjusted training set $D_{adj}$ which—in a first embodiment—makes use of a Monte Carlo simulation procedure. Applying Monte Carlo simulation for classification models does not assign the most likely prediction in all cases, but assigns a label generated by a random experiment using the model confidences for each class label. In the case of a regression model, instead of the expected value (the normal model prediction), a random experiment is performed that assigns a value according to the probability distribution contained in the model, usually a normal distribution with known mean and variance.

Alternatively, an analytic approach may be used for assigning a vector of label probabilities to each data record x in the random data set D'. The label probabilities are generated according to the confidence values or error distributions for each of the predicted labels. In the case of classification, one or more numeric confidences (rather than unique class labels) are assigned to each record x. If the original model is a regression model, a probability distribution is assigned to each record, capturing the uncertainty in the prediction. In order to build a predictive model based on such a training set, an augmented predictive modeling procedure can be used which takes into account the label distributions instead of individual labels for each record. An example would be a Naïve Bayes algorithm which directly uses the label probabilities to obtain the final prediction model.

As mentioned above, the data points generated in this way may lie in areas that are very unlikely according to $P_{est}(X)$. For these cases, $P_{gen}(Y|X)$ would not reliably represent this part of the input space. Thus, if a generated record x lies in a very unlikely area, it is omitted from D' (step 175) and a warning is issued to the user (step 176). The user can then choose to overwrite this decision (step 177). In this way, all records x for which no reliable prediction is possible may be removed (e.g. in an iteration loop).

Method 100 represents a very fast and efficient way for generating an adjusted set $D_{adj}$ of training data: since the number of examples (x,y) that need to be generated is very small, both steps (step 150 of applying the "base model" and step 160 of generating a new model $P_{adj}(Y|X)$ from the labeled examples (x,y)) are very efficient and can be performed in real-time. This affords users the capability of trying different settings for indicator distributions $P_{true}(X)$ interactively and to quickly adapt a model to a new area of application. Among other things, this allows users to combine predictive analytics with an interactive "what-if" analysis to quickly explore the consequences on the decision model based on different assumptions of the situation.

Note that for performing this kind of explorations and investigations, the user requires no access to the source data $D_{orig}$, since steps 150 and 160 of method 100 do not require any access to $D_{orig}$ but rely only on the "base model" $P_{gen}(Y|X)$ generated from $D_{orig}$. Thus, steps 150, 160 may be carried out by a wide range of users without having to worry about confidentiality issues. Furthermore, method 100 may be combined with any data mining algorithm, making it highly flexible and applicable to a wide variety of application scenarios.

Figure 2A:
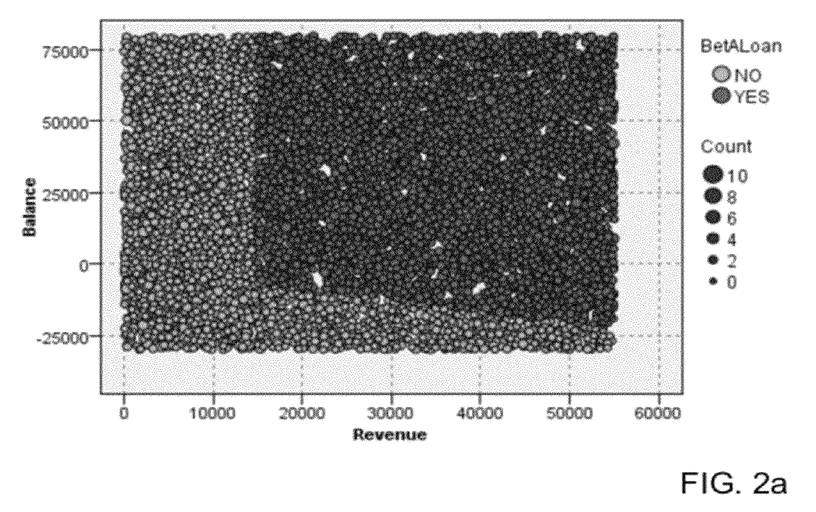
FIG. 2a a graphical representation of the results of a predictive model $P_{gen}$(BetALoan|revenue,balance) aimed at simulating the results of different marketing strategies for granting loans.
Figure 2B:
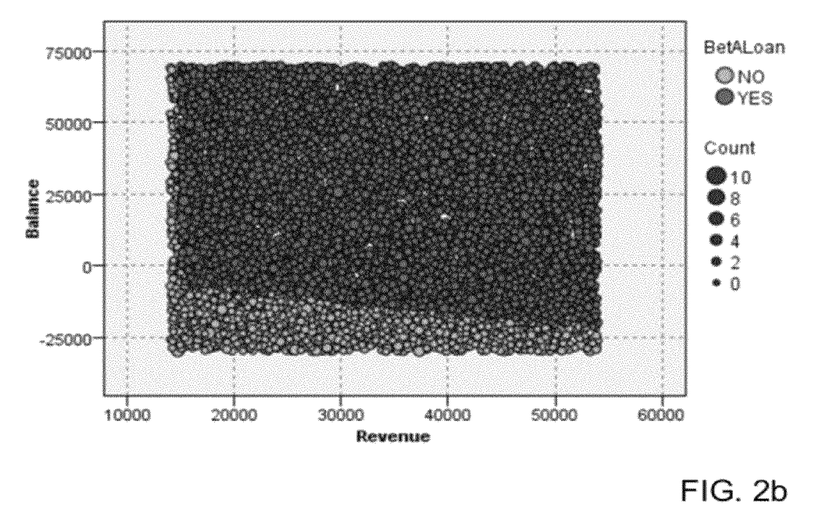
FIG. 2b the predictive model of FIG. 2a, adapted to a strategy targeting customers having high balance.
Figure 2C:
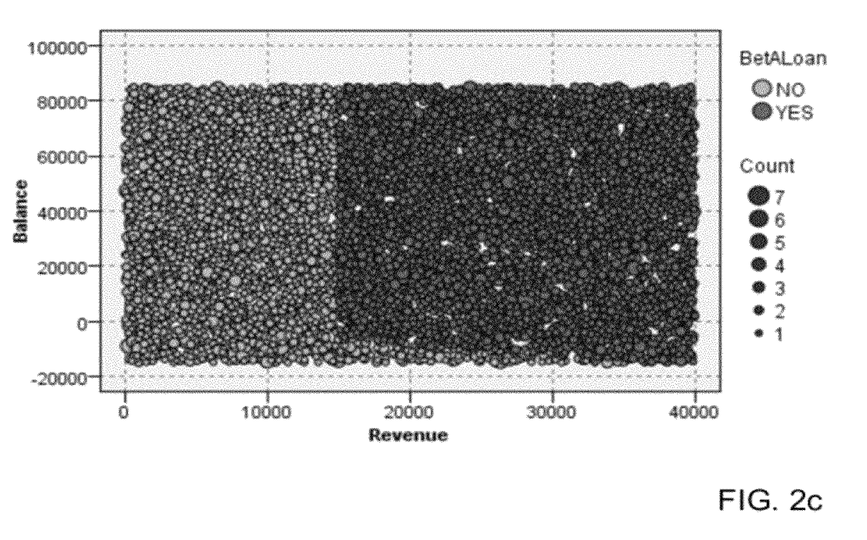
FIG. 2c the predictive model of FIG. 2a, adapted to a strategy preventing customers with low revenue.

FIGS. 2a-2c show an example illustrating the application of method 100: Assume that a bank is trying to construct a model for deciding whether it is profitable to grant a loan to a customer based on his annual revenue and his current balance. Assume that this bank has numerous branch offices located in regions presenting different revenue and balance repartition.

FIG. 2a illustrates the real repartition of customer data $D_{orig}$ summed over all branch offices. FIG. 2a shows a plane view where the axes correspond to the set of indicators X=(revenue; balance) and the value Y (granting a loan) is categorical (YES or NO) and is represented by the color of the bullets, light bullets corresponding to NO, dark bullets corresponding to YES. Assume that based on this data, the bank generated a highly complex model $R_{gen}$(BetALoan|revenue, balance) aimed at simulating the results of different marketing strategies. For carrying out these simulations, analysts wish to interactively obtain models $P_{adj}$(BetALoan|revenue, balance) representing the results of applying a given strategy. Each strategy (e.g. targeting customers who have a high revenue, preventing loans to customers who have a low balance etc. . . . ) can be simulated as resulting in a new repartition of the data. For example, a strategy of targeting customers having high revenue implies that the bank will focus its attention on a new segment of customers with higher revenues. By the same token, a strategy of preventing loans to customers having low balance implies that the bank will focus its attention on a new segment with a higher balance. Each of these strategies will assume an indicator distribution $P_{true}$ of customer revenues and/or balances. Using the method 100 outlined above, a new adjusted model $P_{adj}$(BetALoan|revenue, balance) can be learned to let the analyst visualize the implications of each strategy on the loan offer.

For example, a strategy targeting customers having high revenue yields a repartition $D_{adj}$ shown in FIG. 2b. This particular repartition $D_{adj}$ results in the following loan granting model:

"If Balance≤$11613, then NO with probability 100% applies to 17% of the customers"

"If Balance>$11613, then YES with probability 98% applies to 83% of the customers".

A different strategy preventing customers having a very low balance from obtaining a loan yields a different repartition $D_{adj}$ shown in FIG. 2c. This particular repartition $D_{adj}$ results in the following loan granting model:

"If Revenue≤$15102/year, then NO with probability 100% applies to 38% of the customers"

"If Revenue>$15102/year, then YES with probability 90% applies to 62% of the customers".

As opposed to the state of the art sampling methods (which are computationally very cost intensive and therefore slow), the method 100 presented here is efficient enough to allow interactive exploration of various possible strategies. Furthermore, as the analysts are working on artificially generated data $D_{adj}$, the security of the raw data $D_{orig}$ containing information about real customers is guaranteed all along the simulation process.

As a further example, assume that the bank has different branch offices located in regions presenting different revenue and balance repartitions and that the model which the analyst generated in order to simulate profitable loans is far too complex and general to be applied by the employees in the branch offices. In this case, using method 100 presented above, the analyst can generate for each branch office an adapted model $P_{adj}$(BetALoan|revenue, balance) which is specific to the revenue and branch repartition $P_{true}$(revenue, balance) of this particular branch office. For example, a branch office in a region where customers tend to have high revenues may receive a model such as "If Balance≤$11613, then NO with probability 100% applies to 17% of the customers"

"If Balance>$11613, then YES with probability 98% applies to 83% of the customers", while a branch office in a region where people tend to have low incomes will receive a model such as "If Revenue≤$15102/year, then NO with probability 100% applies to 38% of the customers"

"If Revenue>$ $15102/year, then YES with probability 90% applies to 62% of the customers".

These models $P_{adj}$(BetALoan|revenue, balance) are simpler than the original generative model and only contain information relevant to the specific branch office for which it was generated. The fact that method 100 is computationally efficient enables updating these specific models $P_{adj}$ (BetALoan|revenue, balance) regularly at very low computational cost. Furthermore, method 100 also ensures that no employee of the branch offices can infer real customer information for they can only access models generated on artificial data $D_{adj}$. Moreover, the generative (base) model $P_{gen}$ was used to compute these adjusted models $P_{adj}$ for the various branch offices. Since this base model $P_{gen}$ was trained based on all the bank's customers (regardless of their original branch office), relevant information originating from the data of other branch offices of the bank is also taken into account to improve the quality of the specific model generated for a particular branch office.

Another application of the invention (besides banking) is in the manufacturing domain. Assume, for example, that a production engineer wishes to predict the probability that a machine tool will fail while working on a work piece, depending on the features of the work piece, ambient temperature and humidity as well as other influencing factors. Such a model may be deployed directly to the machine tool to issue alerts.

For this purpose, historical data could be collected. Subsequently, a usually very complex base model would be created from this data, capturing many patterns that could influence machine tool failure. However, at a given production site, certain work piece materials and/or ambient conditions might never occur, while others may be dominant. Method 100 provides a very easy and flexible way of adapting the predictive model to changing conditions at a given production site. Note that the new model can be deployed before any new data from this production site is available that would reflect the changes. Also, the predictive models used for alerting the machine tools are most likely much simpler than the base model and easier to deploy.

Figure 3:
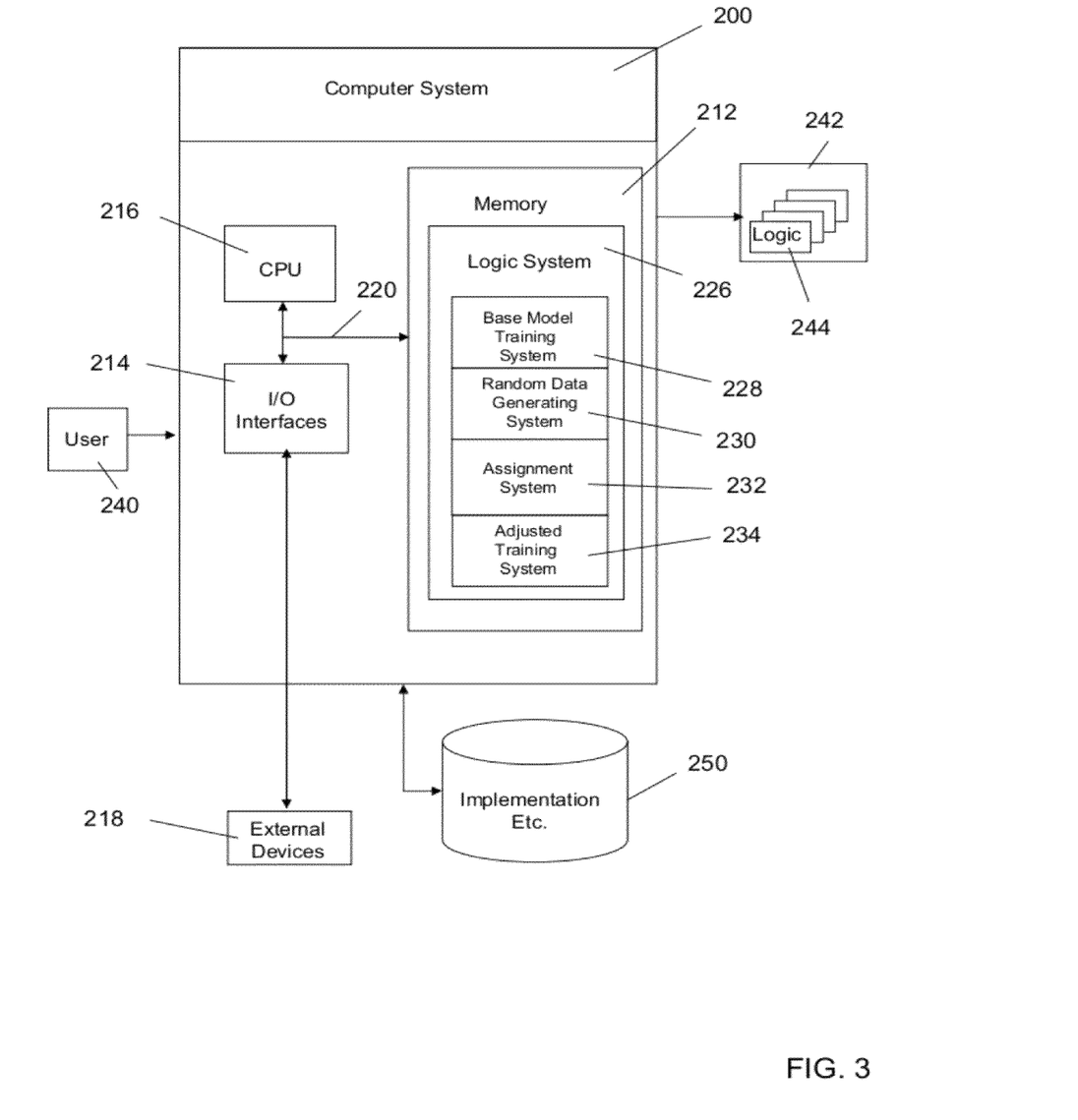
FIG. 3 a computer system implementation of a method for generating a predictive model based on training data $D_{orig}$ and a "true" distribution $P_{true}(X)$ of indicators.

Referring now to FIG. 3, a computer system 200 implementation of an embodiment of the present invention is shown. Specifically, the present invention can be implemented as a computer system 200 and/or program product for carrying out predictive analysis based on an original training set of data $D_{orig}$ and a specific distribution $P_{true}$ of indicators. This allows a user 240, for example an analyst, to generate an adapted model $P_{adj}$ in such a way that both the original training set $D_{orig}$ and the specific distribution $P_{true}$ are taken into account.

As depicted, computer system 200 generally comprises memory 212, input/output (I/O) interfaces 214, a central processing unit (CPU) 216, external devices/resources 218, bus 220 and data base 250. Memory 212 may comprise any known type of data storage and/or transmission media, including magnetic media, optical media, random access memory (RAM), read-only memory (ROM), a data cache, a data object etc. Moreover, memory 212 may reside at a single physical location, comprising one or more types of data storage, or can be distributed across a plurality of physical systems in various forms. CPU 216 may likewise comprise a single processing unit, or be distributed across one or more processing units in one or more locations, e.g. on a client and server. I/O interfaces 214 may comprise any system for exchanging information from an external source, for example keyboards, displays, pointing devices, etc. and can be coupled to computer system 200 either directly or through intervening I/O controllers. External devices 218 may comprise any known type of external device, including keyboard, mouse, voice recognition system, printer, monitor, facsimile etc. Bus 220 provides a communication link between each of the components in the computer system 200 and likewise may comprise any known type of transmission link, including electrical, optical, wireless etc. In addition, although not shown, additional components such as cache memory, communication systems, system software etc. may be incorporated into computer system 200. Network adapters may also be coupled to the system to enable the data processing system or remote printers or storage devices through intervening private or public networks. Modems, cable modem and Ethernet cards are just a few of the currently available types of network adapters.

Database 250 provides storage for information necessary to carry out the present invention. Such information could include e.g. the original training set of data $D_{orig}$, specific distributions $P_{true}$ of indicators etc. Database 250 may include one or more storage devices, such as a magnetic disk drive or an optical disk drive. In another embodiment, database 250 includes data distributed across, for example, a local area network (LAN), wide are network (WAN) or a storage area network (SAN). Database 250 may also be configured in such a way that one of ordinary skill in the art may interpret it to include one or more storage devices. Moreover, it should be understood that database 250 could alternatively exist within computer system 200.

Stored in memory 212 is logic system 226. As depicted, logic system 226 generally includes two Model Training Systems 228, 234, a Random Data Generating System (230) and an Assignment System (232). The systems shown herein carry out the functions described above:

Base Model Training System 228 is used for estimating a distribution $P_{gen}(Y|X)$ based on an original training set $D_{orig}$ containing tuples of the type (x,y) where x represents a vector of indicators and y is a label;

Random Data Generating System 230 is used for generating a random set D' of indicators x based on a distribution $P_{true}(X)$ approximating a true distribution of indicators x;

Assignment System 232 is used for applying the model representing $P_{gen}(Y|X)$ to said random data set D', thus assigning a label y or a distribution of labels to each data point x in said data set D' and generating an adjusted training set $D_{adj}$;

Adjusted Training System (234) is used for training a predictive model $P_{adj}(Y|X)$ based on said adjusted training set $D_{adj}$.

The invention can take the form of an entirely hardware embodiment, an entirely software embodiment or an embodiment containing both hardware and software elements. In an embodiment, the invention is implemented in software, which includes but is not limited to firmware, resident software, microcode, etc.

Furthermore, the invention can take the form of a computer program product accessible from a computer-usable or computer readable medium providing program code for use by or in connection with a computer or any instruction execution system. For the purposes of this description, a computer-usable or computer readable medium can be any apparatus that can contain, store, communicate, propagate, or transport the program for use by on in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and DVD.

The invention claimed is:

1. A method for carrying out predictive analysis, comprising:
   receiving, using a processor of a computer system, a base model (Mgen) estimating a base model distribution (Pgen(Y|X)) based on an original training set (Dorig) containing tuples (x,y) of indicators (x) and corresponding labels (y), wherein the indicators (x) describe influence factors, and wherein the corresponding labels (y) describe a prediction;
   receiving a distribution (Ptrue(X)) approximating a true distribution of the indicators (x) that contains at least one assumption about reality;
   generating a random data set (D') of the indicators (x) based on the true distribution of indicators (Ptrue(X));
   applying the base model (Pgen(Y|X)) to the random data set (D') of the indicators (x) to assign one of a label (y) and a distribution of labels to each indicator (x) in the random data set (D') of the indicators (x) and to generate an adjusted training set (Dadj); and
   training an adjusted predictive model (Padj(Y|X)) based on the adjusted training set (Dadj), wherein the predictive model (Padj(Y|X)) represents the base model distribution (Pgen(Y|X)) and the distribution (Ptrue(X)).

2. The method according to claim 1, wherein receiving the base model (Mgen) further comprises:
   receiving the original training set (Dorig) containing the tuples of the indicators (x) and the corresponding labels (y); and
   training the base model (Mgen) estimating the base model distribution (Pgen(Y|X)) based on the training set (Dorig).

3. The method according to claim 1, further comprising:
   verifying that the base model (Mgen) reliably predicts the one of the labels (y) and the distribution of labels for the random data set (D').

4. The method according to claim 3, wherein verifying further comprises:
   calculating an estimated distribution (Pest(X)) of the indicators (x) in the original training set (Dorig);
   comparing the estimated distribution (Pest(X)) to the true distribution (Ptrue(X)) reflecting the true distribution of the indicators (x); and
   issuing a density warning depending on discrepancies between the estimated distribution (Pest(X)) and the true distribution (Ptrue(X)).

5. The method according to claim 4, wherein verifying further comprises:
adjusting the random data set (D') based on the density warning.

6. The method according to claim 1, wherein generating the adjusted training set (Dadj) uses a Monte Carlo simulation for assigning a label (y) to each data point (x) in the random data set (D').

7. The method according to claim 1, further comprising:
using an analytic methodology for assigning a vector of label probabilities to each data point (x) in the random data set (D') to generate the adjusted training set (Dadj).

8. A computer program product for carrying out predictive analysis, comprising:
a non-transitory computer-readable storage medium storing program code, wherein the program code, when run on a computer, causes the computer to perform:
receiving a base model (Mgen) estimating a base model distribution (Pgen(Y|X)) based on an original training set (Dorig) containing tuples (x,y) of the indicators (x) and corresponding labels (y), wherein the indicators (x) describe influence factors, and wherein the corresponding labels (y) describe a prediction;
receiving a distribution (Ptrue(X)) approximating a true distribution of the indicators (x) that contains at least one assumption about reality;
generating a random data set (D') of the indicators (x) based on the true distribution of indicators (Ptrue(X));
applying the base model (Pgen(Y|X)) to the random data set (D') of the indicators (x) to assign one of a label (y) and a distribution of labels to each indicator (x) in the random data set (D') of the indicators (x) and to generate an adjusted training set (Dadj); and
training an adjusted predictive model (Padj(Y|X)) based on the adjusted training set (Dadj), wherein the predictive model (Padj(Y|X)) represents the base model distribution (Pgen(Y|X)) and the distribution (Ptrue (X)).

9. The computer program product according to claim 8, wherein, when receiving the base model (Mgen), the program code, when executed on the computer, causes the computer to perform:
receiving the original training set (Dorig) containing the tuples of the indicators (x) and the corresponding labels (y); and
training the base model (Mgen) estimating the base model distribution (Pgen(Y based on the training set (Dorig).

10. The computer program product according to claim 8, wherein the program code, when executed on the computer, causes the computer to perform:
verifying that the base model (Mgen) reliably predicts the one of the labels (y) and the distribution of labels for the random data set (D').

11. The computer program product according to claim 10, wherein, when verifying, the program code, when executed on the computer, causes the computer to perform:
calculating an estimated distribution (Pest(X)) of the indicators (x) in the original training set (Dorig);
comparing the estimated distribution (Pest(X)) to the true distribution (Ptrue(X)) reflecting the true distribution of the indicators (x); and
issuing a density warning depending on discrepancies between the estimated distribution (Pest(X)) and the true distribution (Ptrue(X)).

12. The computer program product according to claim 11, wherein, when verifying, the program code, when executed on the computer, causes the computer to perform:
adjusting the random data set (D') based on the density warning.

13. The computer program product according to claim 8, wherein generating the adjusted training set (Dadj) uses a Monte Carlo simulation for assigning a label (y) to each data point (x) in the random data set (D').

14. The computer program product according to claim 8, wherein the program code, when executed on the computer, causes the computer to perform:
using an analytic methodology for assigning a vector of label probabilities to each data point (x) in the random data set (D') to generate the adjusted training set (Dadj).

15. A data processing system for carrying out predictive analysis, comprising:
a central processing unit; and
a storage device connected to the central processing unit, wherein the storage device has stored thereon program code, and wherein the processor runs the program code to perform operations, wherein the operations comprise:
receiving a base model (Mgen) estimating a base model distribution (Pgen(Y|X)) based on an original training set (Dorig) containing tuples (x,y) of the indicators (x) and corresponding labels (y), wherein the indicators (x) describe influence factors, and wherein the corresponding labels (v) describe a prediction;
receiving a distribution (Ptrue(X)) approximating a true distribution of the indicators (x) that contains at least one assumption about reality;
generating a random data set (D') of the indicators (x) based on the true distribution of indicators (Ptrue(X));
applying the base model (Pgen(Y|X)) to the random data set (D') of the indicators (x) to assign one of a label (y) and a distribution of labels to each indicator (x) in the random data set (D') of the indicators (x) and to generate an adjusted training set (Dadj); and
training an adjusted predictive model (Padj(Y|X)) based on the adjusted training set (Dadj)), wherein the predictive model (Padj(Y|X)) represents the base model distribution (Pgen(Y|X)) and the distribution (Ptrue (X)).

16. The data processing system according to claim 15, wherein the operations for receiving the base model (Mgen) further comprise:
receiving the original training set (Dorig) containing the tuples of the indicators (x) and the corresponding labels (y); and
training the base model (Mgen) estimating the base model distribution (Pgen(Y|X)) based on the training set (Dorig).

17. The data processing system according to claim 15, wherein the operations further comprise:
verifying that the base model (Mgen) reliably predicts the one of the labels (y) and the distribution of labels for the random data set (D').

18. The data processing system according to claim 17, wherein the operations for verifying further comprise:
calculating an estimated distribution (Pest(X)) of the indicators (x) in the original training set (Dorig);
comparing the estimated distribution (Pest(X)) to the true distribution (Ptrue(X)) reflecting the true distribution of the indicators (x); and
issuing a density warning depending on discrepancies between the estimated distribution (Pest(X)) and the true distribution (Ptrue(X)).

19. The data processing system according to claim 18, wherein the operations for verifying further comprise:

adjusting the random data set (D') based on the density warning.

20. The data processing system according to claim 15, wherein the operations further comprise:

using an analytic methodology for assigning a vector of label probabilities to each data point (x) in the random data set (D') to generate the adjusted training set (Dadj).

* * * * *